July 25, 1967 J. F. DYTRT 3,332,754

PRINTED CIRCUIT

Filed April 19, 1963

INVENTOR
JOSEPH F. DYTRT

BY Richard C. Reed
Walter M. O'Brien

ATTORNEYS

United States Patent Office 3,332,754

Patented July 25, 1967

3,332,754

PRINTED CIRCUIT

Joseph F. Dytrt, Forest Heights, Md., assignor to the United States of America as represented by the Secretary of the Navy Filed Apr. 19, 1963, Ser. No. 282,524
3 Claims. (Cl. 29—195)

The invention described herein may be manufactured and used by or for the Government of the United States of America for governmental purposes without the payment of any royalties thereon or therefor.

This application is a continuation-in-part of my copending application, Ser. No. 79,935, filed Dec. 30, 1960, now abandoned.

This invention relates to improved solder plated printed wiring and to a method for alloy electroplating on metals.

Solder electroplating of printed wiring has been heretofore practiced using tin-lead alloys as the plating metal, usually a 60 tin-40 lead alloy and to a lesser extent, a 7 tin-93 lead alloy. The shelf life of the alloy solder plate is relatively short, however. Deterioration of the solderability of the plate is noticeable after about six weeks from plating time. After three months, oxide formation has progressed to the extent that the solder plate will no longer wet and is difficult to cause to flow, at times even with the use of a flux.

The present invention has as an object the provision of an improved solder electroplate on printed wiring. It is also an object to provide a method for the electrodeposition of soft metal ternary alloy plate on metals.

The above and other objects can be accomplished by the practice of the present invention which comprises electroplating the metal from an aqueous fluoborate bath with a ternary alloy of tin, lead and cadmium containing from about 48 to 50% by weight tin, about 32% to 36% by weight lead and the remainder cadmium. The cadmium content of the alloy plate may range from about 14 to 20% by weight. The ternary alloy plate is of high purity but may contain traces of metal impurities derived from the salts used in the bath. The melting point of the ternary alloy plate is in the range of 300 to 365° F. (approximate); the lower the cadmium content, the higher the melting point of the ternary alloy plate. Ternary alloys of the above composition are not obtainable by electroplating from cyanide bath.

Figure 1:
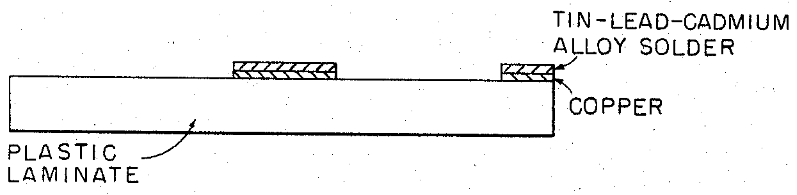
Figure 2:
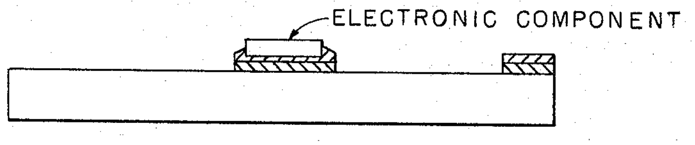

The new electroplates of the invention are illustrated in the accompanying drawing in which:

FIG. 1 is a conventionalized showing of an electroplate of the invention in the form of a printed wiring, and FIG. 2 is a similar showing of an electronic element soldered to the electroplated printed wiring of FIG. 1.

I have found the presence of the cadmium in the new electroplates to provide several advantages over the prior art tin-lead alloy electroplates. A principal advantage is a marked improvement in the oxidation resistance of the electroplates such that they will remain bright and have good solderability without the use of a flux for long periods of storage, several years and more. Another advantage is a lower and wider melting point range for the electroplates. A further advantage has reference to the method and lies in the ease of electroplating to obtain given thicknesses of the alloy electroplate. A still further advantage also has reference to the method and is a lower sensitivity of the plate deposit to high current areas during the electroplating whereby less "treeing" or dendritic growth of the plate occurs.

In the practice of the method of the invention an aqueous solution of tin, lead and cadmium fluoborates, fluoboric acid and boric acid is used as the electroplating bath. The fluoboric acid functions to acidify the bath and the boric acid as pH buffer. A grain refiner may be used as an additive in the bath, if desired, and preferably is, such as gelatin, casein, amino proteins or other proteinaceous materials, the use of which is more or less conventional in electroplating generally. Preferably, gelatin is used.

The electroplating bath is contained in an acid-proof tank for which there may be used, one of steel lined with an acid-resistant plastic such as plasticized polyvinylchloride or one made of polyethylene for smaller quantity platings. The three metals constitute the anode. The metal work-piece is the cathode. An alloy of tin, lead and cadmium, which may be a rough alloy, is preferably used as the anode, although an assembly of individual tin, lead and cadmium strips or bars connected to a common electrical terminal may also be employed as the anode. For the electroplating of a composite workpiece such as printed wiring in which the metal is attached to a non-conducting base such as of plastic which may be, for example, a cured phenolic, epoxide or silicone resin, laminated plastic which may be one of the foregoing cured resins in which glass cloth or paper sheet are embedded as the laminae, the wiring is connected to the electrical terminal to constitute the cathode. In cases where the printed wiring does not constitute a circuit such that a single connection to terminal will suffice, separate leads may be used from the discrete wire sections to the terminal.

Suitable compositions for electroplating baths useful in the practice of the method of the invention are aqueous solutions of from about 7.9 to 9.3% by weight tin fluoborate, $Sn(BF_4)_2$, from about 1.8 to 3.0% by weight lead fluoborate, $Pb(BF_4)_2$, from about 3.3 to 5.0% by weight cadmium fluoborate, $Cd(BF_4)_2$, from about 1.9 to 2.4% by weight fluoboric acid, from about 1 to 1.4% by weight boric acid and from about 0.4 to 0.6% by weight gelatin. A preferred group of electroplating baths are those which contain in aqueous solution, about 9.1% by weight tin fluoborate, about 2.5% by weight lead fluoborate and about 4% by weight cadmium fluoborate. Current densities for the electroplating may range from about 8 to 40 amperes per square foot with a preferred range therefor being from about 10 to 20 amperes per square foot. The electroplating may be conducted at temperatures in the bath which range from about room temperature (75° F.) to somewhat higher, up to about 100° F.

The invention is further illustrated by the following specific example of the application of the method to the electroplating of printed wiring.

*Example*

An aqueous electroplating bath was made up by mixing together 197 ml. of a 46.1% water solution of tin fluoborate [91 gm. $Sn(BF_4)_2$]. 50 ml. of a 50% water solution of lead fluoborate [25 gm. $Pb(BF_4)_2$]. 80 ml. of a 50% water solution of cadmium fluoborate [40 gm. $Cd(BF_4)_2$], and 49.5 ml. of a 43% water solution of fluoboric acid and dissolving therein 12.5 gm. of boric acid and 5 gm. gelatin. The bath was contained in a polyethylene jar in which was suspended a cast alloy of 50% tin-32% lead-18% cadmimum by weight in the form of a flat bar, approximately ¼" thick x 2" wide x 12" long, as the anode and a printed wiring pattern as the cathode. The printed wiring pattern was made up of a reverse-printed copper foil on a plastic laminate of cured phenolic resin and glass cloth laminae, in which the background defining the conductor portions was coated with photoresist (Kodak) to prevent plating thereon. The current density was held at about 10 amperes per square foot and plating conducted at room temperature (75° F.) for one hour. The plated pattern was rinsed in tap water, washed with resist solvent to remove the photoresist therefrom, rinsed in tap water, etched with aqueous chromic sulfuric acid solution to form the completed printed wiring, and rinsed with tap water. The plate of the ternary alloy was approximately 1.5 mils thick, of matte finish and a uniform silvery-grey in color. Analysis of the plate (approximate): 50% tin, 36% lead and 14% cadmium by weight. Melting point of the plate 365° F. (approximate).

While in the above example the printed wiring was plated before etching, the electroplating may also be performed with equally good results on printed wiring after etching. In the usual case, the ternary alloy plate of tin, lead and cadmium will serve as the resist and, on etching, the solder plated printed wiring in the desired pattern will be obtained.

Solder plated printed copper wirings obtained by the method of the invention which had been stored for a period of three years were tested for solderability without the use of a flux and found to readily flow and wet in each instance.

Electroplates of the invention can be obtained by the foregoing method in varying thicknesses by control of the plating time and current density. A practical minimum for a solder electroplate of the ternary alloy is about one-half mil with recommended thicknesses for printed wiring circuits ranging from about 0.5 to 2 mils.

The method of the invention is of general application for the plating of metals with a soft metal surface. For example, soft metal ternary alloy platings may be made on such metals as iron and iron alloys, bronzes, brasses and other copper alloys, silver, aluminum and its alloys, etc. A further specific application of the method of the invention is the provision of a soft metal wearing surface on metal bearings.

Since the invention may be variously embodied without departing from the spirit or scope thereof, it is to be understood that specific embodiments appearing in the above description shall be taken by way of illustration and not in limitation except as may be defined in the appended claims.

What is claimed is:

1. A printed wiring comprising copper foil printed on a nonconducting base and coated on its upper surface with a thin electroplate of a ternary alloy of tin, lead and cadmium containing from about 48 to 50% by weight tin, from about 32 to 36% by weight lead and from about 14 to 20% by weight cadmium.

2. A printed wiring as defined in claim 1, wherein the thin ternary alloy electroplate on the copper foil contains about 50% by weight tin, about 36% by weight lead and about 14% by weight cadmium.

3. A printed circuit comprising copper foil printed on a nonconducting base and coated on its upper surface with a thin electroplate of a ternary alloy of tin, lead and cadmium containing from about 48 to 50% by weight tin, from about 32 to 36% by weight lead and from about 14 to 20% by weight cadmium.

References Cited

UNITED STATES PATENTS

| | | | |
|---|---|---|---|
| 2,563,536 | 8/1951 | Laing | 200—123 |
| 2,609,338 | 9/1952 | Gray | 204—43 |
| 2,734,025 | 2/1956 | Roehl | 204—43 |
| 2,893,934 | 7/1959 | Westbrook | 204—50 |

FOREIGN PATENTS

| | | |
|---|---|---|
| 329,346 | 5/1930 | Great Britain. |

OTHER REFERENCES

Clark, D. S., et al.: "Physical Metallurgy for Engineers," p. 452 (February 1958).

Solov'ev, N. A.: "Investigation of the Electrolytic Deposition of an Alloy of Lead, Tin, and Zinc," Zhur. Prick-lad. Khim. 27, No. 12, pp. 1263–1268 (1954). A brief description of this article is given in Brenner, A., "Electrodeposition of Alloys," vol. II, p. 27 (1963).

JOHN H. MACK, *Primary Examiner.*

R. HARDER, G. KAPLAN, *Assistant Examiners.*